SOUND MOVIES AND METHODS OF MAKING SAME

Filed Jan. 27, 1971 3 Sheets-Sheet 1

FRANKLIN C. WILLIAMS
INVENTOR.

Walter O. Hodsdon
Robert T. Cody
ATTORNEYS

FRANKLIN C. WILLIAMS
INVENTOR
BY [signature]
[signature]
ATTORNEYS

May 30, 1972 F. C. WILLIAMS 3,666,356

SOUND MOVIES AND METHODS OF MAKING SAME

Filed Jan. 27, 1971 3 Sheets-Sheet 3

FRANKLIN C. WILLIAMS
INVENTOR.

Walter O. Hodsdon
Robert F. Cody

ATTORNEYS

United States Patent Office 3,666,356

Patented May 30, 1972

3,666,356

SOUND MOVIES AND METHODS OF MAKING SAME

Franklin C. Williams, Rochester, N.Y., assignor to Eastman Kodak Company, Rochester, N.Y.

Filed Jan. 27, 1971, Ser. No. 110,226
Int. Cl. G03b 31/02
U.S. Cl. 352—5 4 Claims

ABSTRACT OF THE DISCLOSURE

A technique is disclosed for applying a sound record made by means of a tape recorder to the sound track of an amateur motion picture film depicting action corresponding to such sound record. To effect such technique, playback of the tape is done at the tape recording speed; and recording on the film sound track is done while running the film at projection speed. The sound track is kept at true pitch, and in synch with, the filmed action by selectively excising and shifting, or gapping, the sound record whenever the sound gets more than a certain amount out of synch with the filmed action.

BACKGROUND OF THE INVENTION

Field of the invention

Figures 1A, 1B, 2A, 2B:
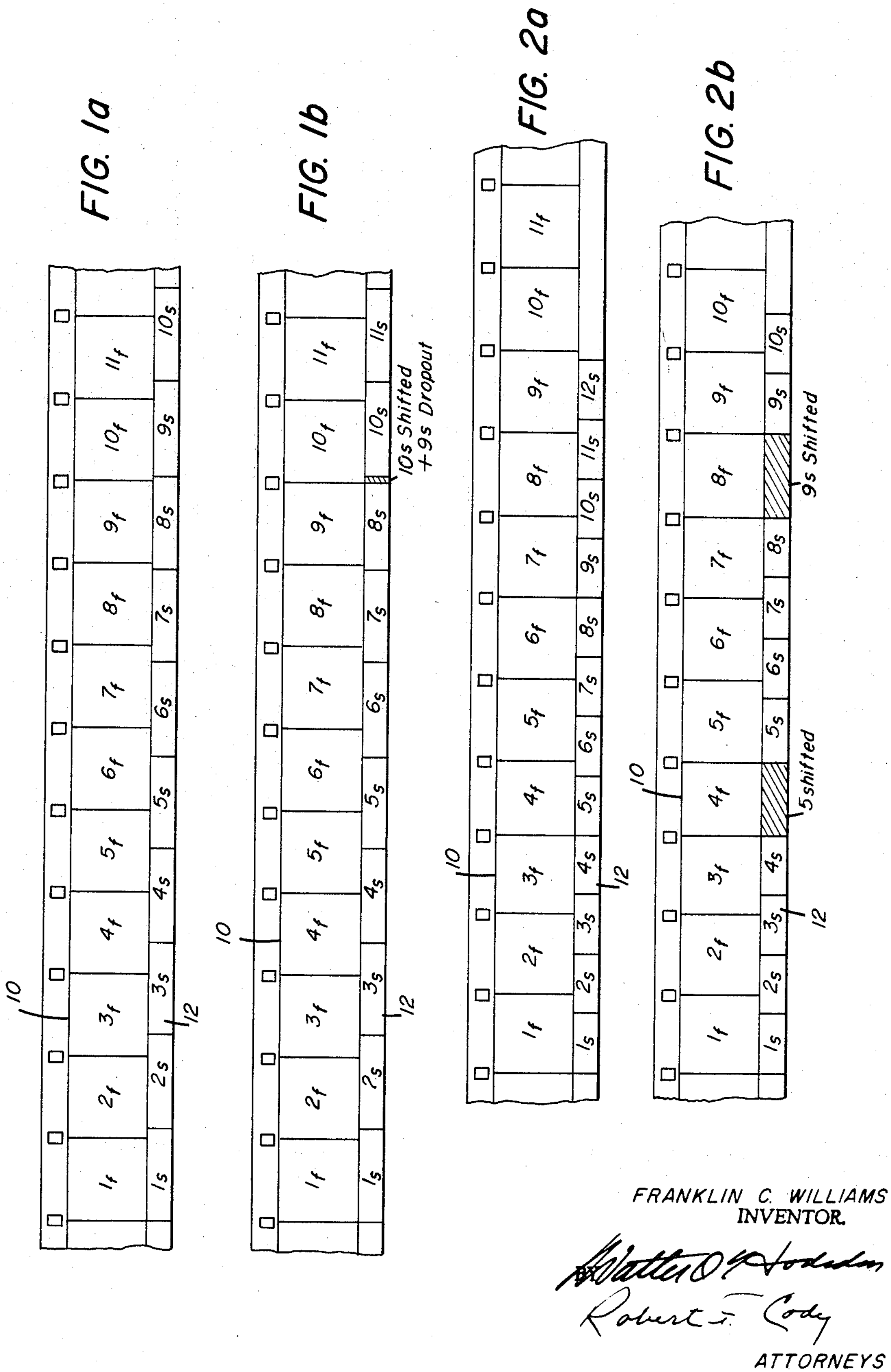

This invention relates in general to audio recording and in particular to the production of amateur sound movies; still more particularly, the invention relates to synchronizing an audio message with visual action recorded on film without altering the pitch of the audio or the speed of the filmed action.

Description relative to the prior art

Amateur motion pictures incorporating sound tracks are usually produced by first recording the sound on a standard tape recorder, and then applying the audio message to the movie film after the film has been processed (developed). Synchronization of the audio with the filmed action is accomplished by having the camera place electronic "marks" on the magnetic tape, such marks corresponding in time with the exposure of each frame of film. Frame marks may take the form of ultrasonic pulses superimposed over the taped audio message, or they may be applied to a separate track on the tape. Cameras used for taking amateur movies often operate at speeds slightly faster or slower than desired. Such discrepancies in operating speed may be attributed to low battery power, or to poor lubrication, or to low ambient temperatures, etc. On the other hand, since tape recorders and movie projectors usually operate on alternating "house current," their drive speeds will rarely vary appreciably from exact desired speeds.

Pictures from a slow-running camera will, when shown by a projector running at aim speed, show action somewhat faster than actually occurred. Pictures from a fast-running camera will similarly show action slower than occurred. Such errors in speed reproduction are generally not noticed, or are tolerable.

If the sound record, however, is kept synchronous with the filmed action upon projection, the sound—in the case of a slow-running camera—will be reproduced with a pitch higher than actually occurred; and sound—in the case of a fast-running camera—will be reproduced with a pitch lower than actually occurred. Changes in pitch of only a few percent are objectionable, and fluctuations of pitch, as would result in the projection of pictures taken with a camera at varying speeds, are even more objectionable.

Consider the following: It is desired to impose upon a magnetic stripe on a movie film the audio record taken along with such film. It can be assumed that the audio message was recorded at a tape speed of 1⅞ inches per second; and that the tape can be played at the photographic laboratory at that same speed in order to maintain proper pitch while using such tape as a source of sound for the audio record to be placed on the movie film. If this is done, and if the film magnetic stripe is passed under its recording head at the exact rate at which it will ultimately pass the sound head of a movie projector, the audio record will be produced during the movie projection at proper pitch. (If the audio tape is "played," for the recording purpose, at a speed differing from normal playing speed by a factor $k$, and if the film strip is passed under its recording head at a speed that likewise is $k$ times the rate at which it will pass the projector's sound head, the audio record will in this case also be produced during the movie projection at proper pitch.

But if the movie camera had been running slower than aim (that is, filming occurred at a rate slower than the projection rate), the procedure described immediately above will cause the sound to lag increasingly behind the filmed action; i.e., events in the sound record will be presented at the rate at which they happened, but events in the picture record will be presented at a rate faster than they happened. If a typical modern movie camera were to take pictures at a rate uniformly only 90% of the usual projection rate, at the end of a projection run of 50 feet of film the sound would lag behind the action by almost 400 frames, i.e., by more than 20 seconds.

SUMMARY OF THE INVENTION

It is considered desirable to permit no more lack of synchronism between picture and sound than the duration of, say, one frame (1/18 second): and such synchronism can be achieved without objectionable deterioration of sound quality by occasionally removing small segments of the audio record, and joining the remainder, if faster presentation of audio events is required; or by occasionally adding to the audio record, say by repetition of small segments of the record, if slower presentation of audio events is required.

In one form of the invention, repeating/deleting portions of an audio message is accomplished by use of a common recording head in combination with two or more playback heads and a multiple track magnetic tape, such tape tracks having respective recordings and each of such recordings being identical with an original or master recording. By causing the playback heads to advance or retreat (alternately) in relation to the direction of tape travel, and by switching the coupling to the recording head from one playback head to the other, portions of the audio message to be placed on the film may be recorded twice (moving the unconnected playback head in a retreating direction, and then switching the recording head connection to such playback head) or deleted entirely (advancing the unconnected playback head, and then switching the recording head connection to such playback head).

An object of the invention is to provide a way to lengthen or shorten the playing time of an audio message without altering the pitch of the message.

Another object is to provide a way to synchronize an audio message with visual action in movies.

Another object is to provide a motion picture film product with a sound recording thereon, the sound having proper pitch and being in synchronization with the filmed action, regardless of camera speed factors.

Figure 3:
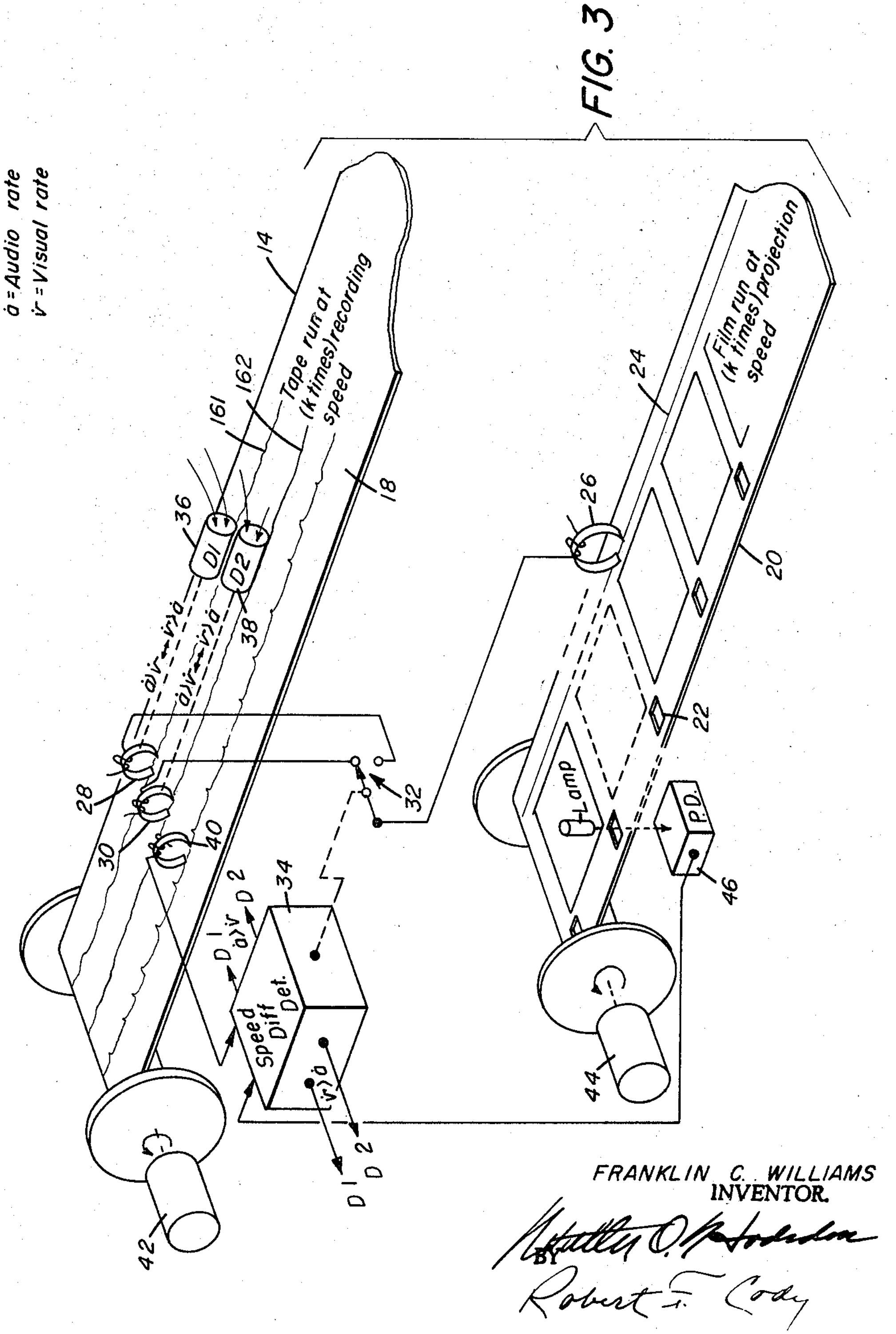
Figure 4:
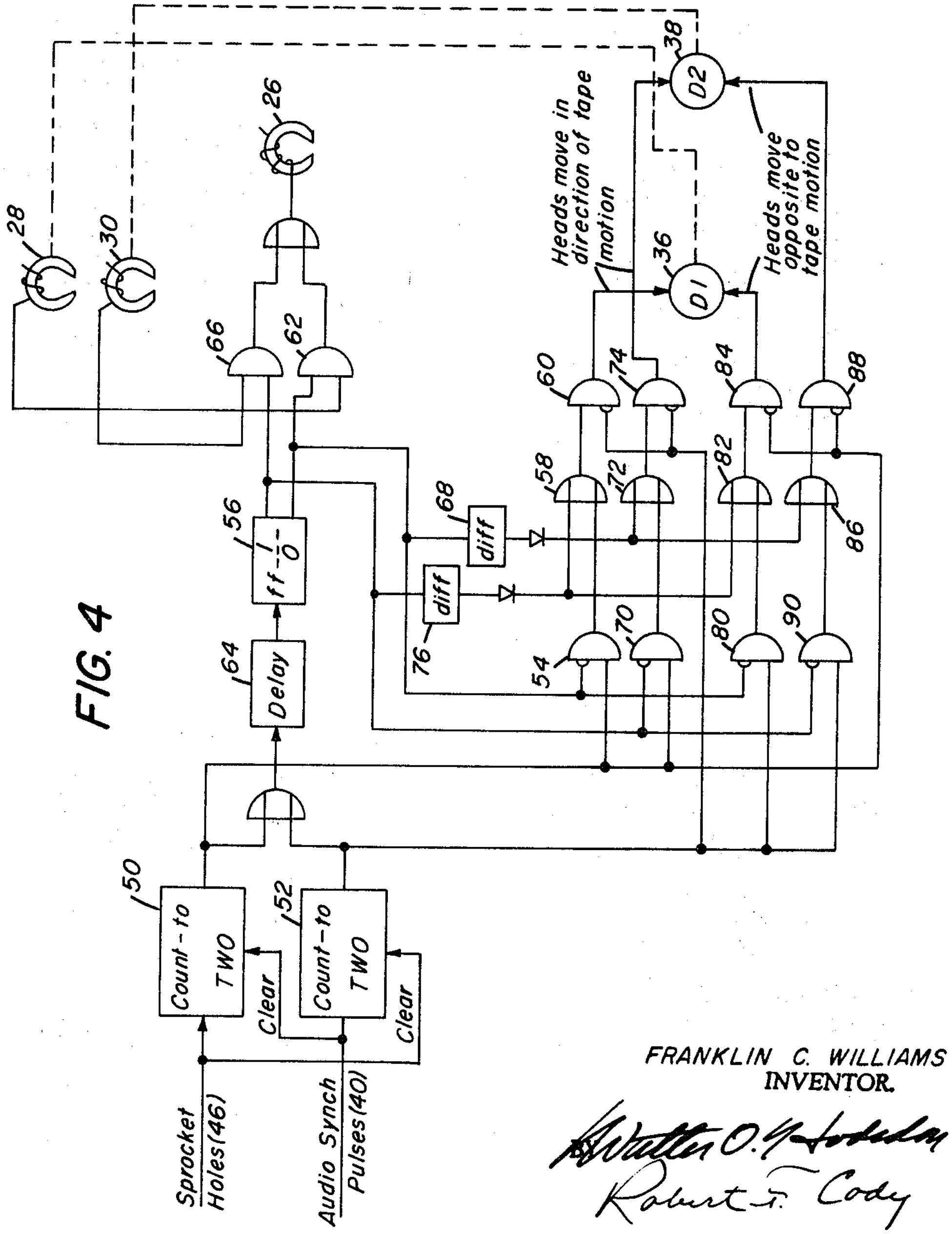

The invention will be described with reference to the figures, wherein:

FIGS. 1*a* and 1*b* illustrate how a movie film taken with a slow-running camera may be provided with a synchronized sound track at proper pitch, FIGS. 2*a* and 2*b* illustrate how a movie film taken with a fast-running camera may be provided with a synchronized sound track at proper pitch, FIG. 3 is a perspective view illustrating a technique for implementing the invention, and FIG. 4 illustrates a logic circuit for practicing the invention in the form thereof indicated in FIG. 3.

FIGS. 1 and 2 are presented to illustrate the concepts of the invention:

FIG. 1*a* indicates a film strip 10 having a sound track 12. The filming in question occurred with a slow-running camera; and the sound track was produced by playing-back a tape recorder at recording speed, while recording therefrom on the film strip as such strip was run at its projection speed. (The sound track might also have been produced by playing back a tape recorder at $k$ times recording speed, where $k$ may be any constant factor, while recording therefrom on the film strip as such strip was run at $k$ times projection speed.) Thus, as noted above, the "projectable" audio message, although of proper pitch, gradually gets out of synch with the projectable filmed action. (Terms such as "projectable sound" as used herein relate to the replay of a sound track while running such track past a playback head at film projection speed.) The designation $1_f$, $2_f$ . . . and $1_s$, $2_s$ . . . relate respectively to frame action and the sound messages to accompany such action.

To be noted is that at frame $9_f$ of the film strip 10, the audio message $9_s$ is a full frame behind its corresponding action. According to the invention, whenever the "proper pitch" sound message gets more than a certain amount behind synch with its corresponding action (say, one frame out of synch), a portion of the sound message is dropped, the remainder thereof being shifted into synch with the filmed action. See FIG. 1*b*, which indicates that the sound message $9_s$ has been dropped; and that the sound messages $10_s$, $11_s$ . . . have been shifted to coincide (almost) with the corresponding filmed action.

Whereas the ear will hear the recorded sound at true pitch, the effect of dropping the audio message $9_s$ will be audibly imperceptible.

In FIG. 2*a*, a film strip 10 produced by a fast-running camera has a sound track 12 which, when played at projection speed, produces audio at true pitch. Since the sound in question is produced during projection at its occurrence rate, and since the action on the film strip is slowed during projection, the sound gains on, and gets out of synch with, such action. FIG. 2*b* shows that, in accordance with the invention, whenever the sound is more than a certain amount out of synch (say, by a whole frame) with the filmed action, e.g., see frame $4_f$ and sound message $4_s$, such sound message is shifted to coincide with with its corresponding visual action, the gap produced by such message shift being either left blank, or filled, say by repeating the message which had last occurred:

The effect of such gap, or repeated message, will be imperceptible to the ear, or nearly so.

Reference should be had to FIG. 3 which shows a system for producing sound movie films as indicated in FIGS. 1*b* and 2*b*.

A three-track recording tape 14—which may be reusable—has duplicate in-phase recordings $\mathbf{16_1}$, $\mathbf{16_2}$ which are identical with (i.e., copies of) a sound record made while filming certain action; the third of such tracks, 18, has the aforementioned audio synch pulses, or frame marks, therein. Ways to produce the tape 14 form no part of the invention; and are within the scope of those in the art.

The filmed action appears on a processed movie film 20, and such film 20 has, typically, sprocket holes 22. The film 20 is provided with a magnetic stripe 24 onto which is to be impressed a proper pitch, in synch, recording that corresponds to the filmed action.

A recording head 26 cooperates with the recording stripe 24; and such head 26 is selectively coupled to either one, or the other, of a pair of playback heads 28, 30 respectively cooperative with the sound tracks $\mathbf{16_1}$, $\mathbf{16_2}$. A switch 32, symbolically indicated as being mechanical in form, and responsive to the output of a device 34, effects the indicated selective switching between playback heads 28, 30. (Instead of the simple and discrete switching schematically shown by 32, an arrangement for gradual transfer could be used.)

The playback heads 28, 30 are selectively positionable lengthwise of the tape 14 by means of respective stepping motors 36, 38; and typically the motors, on command, step their respective heads distances which are equivalent to the distance between tape frame marks 18. Frame marks 18 are read by means of a playback head 40.

The tape 14 is run, by means of a motor 42, past the playback heads 28, 30, 40 at recording speed so that the sound pickup will be at true pitch; and the striped film 20 is run past the recording head 26 at projection speed so that the playback of the stripe 24 record during projection of the film 20 will be at true pitch. (Both speeds can, if desired, be multiplied by the same factor $k$, and $k$ can vary at any time so long as it always applies to both speeds.)

Assuming that filming took place with a camera run at projection speed, the occurrence rates for audio synch pulses read by means of the head 40 (audio rate $\dot{a}$) and for frame-representative pulses produced by means of a sprocket hole (photo) detector 46 (visual rate $v$), will be the same. Attendantly, under such circumstance, one playback head would remain continuously connected to the recording head 26; and a true pitch sound recording would simply be transferred—in synch with the filmed action—from one sound track ($\mathbf{16_1}$, or $\mathbf{16_2}$) to the stripe 24.

The purpose of the device 34 is to determine when, because of differences in the occurrence rates for the sound record audio synch pulses 18 and their corresponding frames (as determined, for example, by sprocket holes 22), to delete from, or to gap, the stripe 24 recording, thereby to keep the "projectable" sound in synch with the filmed action, and at proper pitch:

In response to a slow camera speed out-of-synch condition ($v > \dot{a}$, during projection), the device 34 causes the playback head which is "not connected" with the recording head 26 to move a discrete amount (equivalent, for example, to the distance between frame marks 18) opposite to the direction of tape 14 travel; after which the recording head 26 is switched to the repositioned head; and after such switching, the switched-from playback head is similarly positioned alongside the switched-to playback head, thereby to ready it for a subsequent out-of-synch condition.

In response to a fast camera speed out-of-synch condition ($\dot{a} > v$, during projection), the device 34 causes the playback head which is "not connected" to the recording head 26 to move a discrete amount (equivalent to the distance between frame marks 18) in the direction of tape 14 travel; after which the recording head 26 is switched to the repositioned head; and after such switching, the switched-from playback head is similarly positioned alongside the switch-to playback head, thereby to ready it for a subsequent out-of-synch condition.

There follows a description relative to the operation of a logic circuit for implementing the playback head motion and switching indicated above:

SLOW CAMERA SPEED

As previously noted, a slow camera manifests itself in a greater occurrence rate (during projection) for "framed action"—i.e., sprocket holes 46—than for true pitch audio synch pulses 40. Thus, by applying sprocket hole pulses 46 to a count-to-two counter 50, and applying the audio synch pulses 40 to a count-to-two counter 52, and by cross-clearing such counters with the input pulses of each other, periodically (depending on the rate difference between the two pulse inputs) the counter 50 will receive two pulses—and spill over—before being cleared. Each such spill-over pulse is applied through an inhibit gate 54 (held open by means of the ZERO state of a flip-flop 56, which ZERO state corresponds to the unconnected playback head), through an OR gate 58, and thence through an inhibit gate 60 to the stepping motor 36.

The motor 36 positions—in this case in the direction of tape travel—the playback head 28, which head 28 is not connected to the recording head 26 because an AND gate 62 is held closed by means of the ZERO state of the flip-flop 56.

The spill-over pulse from the counter 50 is also applied through a delay device 64 (which serves to assure head-positioning before head-switching) to the flip-flop 56, thereby to switch the connection to the recording head 26 from the playback head 30 (via an AND gate 66) to the repositioned playback head 28 (via and the AND gate 62).

As soon, however, as the recording head is switched to the repositioned head, such switching, as detected by a differentiator 68, causes the motor 38 cooperative with the switched-from head 30 to reposition such head 30 to a place alongside the switched-to head 28. And since the switched-to playback head 28 has been advanced framewise in the direction of tape 14 travel, a frame of the true pitch sound track 24 is excised. See FIG. 1*b*.

The inhibit gate 60 serves to define the "advance direction" of head travel.

In response to the next spill-over pulse from the counter 50, a frame of the true pitch sound track is again excised . . . the inhibit gate 70, the OR gate, the inhibit gate 74, and the differentiator 76 performing the respective functions of corresponding circuit elements 54, 58, 60, 68, only this time the playback head 30 is moved first, after which the recording head 26 is connected back to the head 30, and then the unconnected playback head 28 is stepped to a position alongside the head 30.

The above-described head positioning-switching is continually repeated, thereby to effect a true pitch sound record that is in synch with the action depicted in the film 20.

FAST CAMERA SPEED

As noted previously, projection of a film taken with a fast-running camera causes the action to slow in relation to a true pitch "projectable" sound record taken at the time of filming. Thus, with the setup of FIG. 3, audio synch pulses 40 will occur at a faster rate than sprocket hole pulses 46, causing the counter 52 periodically to spill over.

With the inhibit gate 80 held open, by virtue of the ZERO state of the flip-flop 56, the spill-over pulse from the counter 52 is applied through an OR gate 82 to an inhibit gate 84. Since the counter 50 has no output for a "fast camera speed" condition, the inhibit gate 84 pulses the stepping motor 36 to move the (unconnected) playback head 28 backwards with respect to the direction of tape 14 travel; and after such head 28 is repositioned, the delay 64 produces an output pulse which switches the connection to the recording head 26 from the playback 30 to the playback head 28. Thus, a small frame-wise portion of the sound track impressed on the recording stripe 24 is repeated, thereby to maintain synchronization between the filmed action and the true pitch sound record.

Switching of the flip-flop 56, as detected by the differentiator 68, causes an OR gate 86 to pulse the stepping motor 38 via an inhibit gate 88, thereby to reposition the switched-from playback head 30 to a place alongside the switched-to playback head 28.

The next occurrence of a spill-over pulse from the counter 52—again evidencing the out-of-synch condition—causes the motor 38 to reposition the unconnected playback head 30, after which the playback head 30 is connected to the recording head 26; and then the unconnected head 28 is repositioned to a place alongside the head 30.

The spill-over pulse from the counter 52 is applied to the motor 38 via an inhibit gate 90, and the gates 86, 88.

The invention has been described in detail with particular reference to preferred embodiments thereof, but it will be understood that variations and modifications can be effected within the spirit and scope of the invention. The invention, it is emphasized, concerns the concept, in connection with movie film with a sound track, of forcing synchronization between filmed action and a true pitch audio record on said track by selectively and periodically deleting from and shifting, or gapping, the audio record.

What is claimed is:

1. The method of applying a taped sound record corresponding to, and in synchronization with action appearing in, a movie film having a sound track comprising the steps of:

(a) playing-back the taped sound record substantially at $k$ times its recording speed,
(b) applying audio signals corresponding to the played-back sound record to the movie film sound track while running the film substantially at $k$ times its projection speed past a recording head,
(c) comparing the correspondence between the sounds recorded in the said track and their respective filmed action, and
(d) in response to discrepancies greater than a predetermined amount which may occur in said correspondence, selectively shifting the lengthwise location of the sounds recorded in said sound track so that said sounds are in close correspondence with their respective filmed action.

2. The method of applying a sound record that corresponds to filmed action to the sound recording stripe of a movie film depicting such action comprising the steps of:

(a) running said sound record and said film recording stripe respectively past playback and recording heads at $k$ times the speed at which the said sound record was made and at $k$ times the speed at which the film is to be projected, and while doing so,
(b) applying signals from said playback head to said recording head,
(c) checking continually the relative location, with respect to said film, between the various sound signals and their respective filmed action, and
(d) in the event of misregistration, greater than a predetermined amount, between sound signals and their respective filmed action, gapping, excising, and shifting, as needed, said sound signals to synchronize the sounds of said recording stripe with the action of said film.

3. The method of applying a sound record to the recording stripe of a movie film that indicates action corresponding to the said sound record comprising the steps of:

(a) making duplicates of the said sound record,
(b) running said duplicate sound records past respective playback heads at $k$ times their recording speed,
(c) running the movie film past a recording head at $k$ times the projection speed for said film,
(d) applying playback signals from one, or the other, of said playback heads to the said recording head,
(e) detecting when the filmed action has gotten ahead or behind its corresponding sound record by more than a certain amount, and in response thereto,
(f) moving the playback head which is not applying signals to said recording head a discrete amount in the direction of travel of its respective record, or opposite thereto, depending respectively on whether said sound record is getting behind or ahead of the filmed action, (g) switching the application of signals to the recording head from the unmoved playback head to the moved playback head, and (h) moving the switched-from playback head along its respective record in a manner similar to the way in which the switched-to playback head was moved.

4. A sound movie film made by applying to the sound track thereof a taped sound record corresponding to the action depicted in said film, the method of applying said sound record to said film sound track comprising the steps of:

(a) playing-back the taped sound record substantially at $k$ times its recording speed, (b) applying audio signals corresponding to the played-back sound record to the movie film sound track while running the film substantially at $k$ times its projection speed past a recording head, (c) comparing the correspondence between the sounds recorded in the said track and their respective filmed action, and (d) in response to discrepancies greater than a predetermined amount which may occur in said correspondence, selectively shifting the lengthwise location of the sounds recorded in said sound track so that said sounds are in close correspondence with their respective filmed action.

References Cited

UNITED STATES PATENTS

| | | | |
|---|---|---|---|
| 2,480,162 | 8/1949 | Rath | 352—5 |
| 3,049,965 | 8/1962 | Gunst | 352—5 |

SAMUEL S. MATTHEWS, Primary Examiner
M. L. GELLNER, Assistant Examiner

U.S. Cl. X.R.

352—12